United States Patent
Zhao et al.

(10) Patent No.: US 7,782,851 B2
(45) Date of Patent: Aug. 24, 2010

(54) SYSTEM AND METHOD OF DETECTING LOST VIDEO DATA PACKETS

(75) Inventors: Yongdong Zhao, Pleasanton, CA (US); Kuo-Hui Liu, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 355 days.

(21) Appl. No.: 11/823,119

(22) Filed: Jun. 26, 2007

(65) Prior Publication Data

US 2009/0003360 A1    Jan. 1, 2009

(51) Int. Cl.
*H04L 12/28* (2006.01)
*H04L 12/56* (2006.01)

(52) U.S. Cl. ....................................................... 370/390
(58) Field of Classification Search ........................ None
See application file for complete search history.

(56) References Cited

U.S. PATENT DOCUMENTS

| | | | |
|---|---|---|---|
| 6,085,253 A | 7/2000 | Blackwell et al. | |
| 6,449,654 B1 | 9/2002 | Blackwell et al. | |
| 2002/0188748 A1 | 12/2002 | Blackwell et al. | |
| 2003/0066016 A1 | 4/2003 | Wehage | |
| 2003/0067872 A1 | 4/2003 | Harrell et al. | |
| 2003/0120802 A1* | 6/2003 | Kohno | 709/237 |
| 2003/0152080 A1 | 8/2003 | O'Brien | |
| 2005/0169199 A1 | 8/2005 | Futenma et al. | |
| 2006/0259844 A1* | 11/2006 | Kawada | 714/748 |
| 2007/0260921 A1* | 11/2007 | Cankaya et al. | 714/18 |

* cited by examiner

*Primary Examiner*—Chirag G Shah
*Assistant Examiner*—Minh-Trang Nguyen
(74) *Attorney, Agent, or Firm*—Toler Law Group

(57) ABSTRACT

Systems and methods of detecting lost packets are disclosed. In an embodiment, a method is disclosed that includes receiving a first request to retransmit a first packet. The method also includes selectively retransmitting the first packet based on a first list that identifies packets to retransmit and based on a second list that identifies packets that have been retransmitted.

10 Claims, 5 Drawing Sheets

SYSTEM AND METHOD OF DETECTING LOST VIDEO DATA PACKETS

FIELD OF THE DISCLOSURE

The present disclosure is generally related to detecting lost video data packets.

BACKGROUND

Multimedia content may be delivered from a source to a receiver via a sequence of video data packets. Image quality may be affected by the loss of one or more packets of a video data packet stream. Although an expected packet that is not received can be re-sent, excessive bandwidth may be consumed by resending packets that are in transit to the receiver. Hence, there is a need for an improved system and method of detecting lost video data packets.

DETAILED DESCRIPTION

In a particular embodiment, a system is disclosed that includes an interface to receive data from multiple multimedia receivers via a network. The system also includes a processor and a memory accessible to the processor. The memory includes instructions to cause the processor to execute a method that includes receiving a first message indicating that a first packet has not been received at a first multimedia receiver. The method also includes sending the first packet based on the first message. The method includes receiving a second message indicating that the first packet has not been received at the first multimedia receiver. The method further includes determining a delivery status of the first packet.

In another embodiment, a method of detecting lost video data packets is disclosed. The method includes receiving a first request to retransmit a first video data packet. The method also includes selectively retransmitting the first video data packet based on a first list that identifies video data packets to retransmit and based on a second list that identifies video data packets that have been retransmitted.

In another embodiment, a computer readable medium is disclosed. The computer readable medium has computer readable instructions to cause a processor to execute a method. The method includes receiving a first request to retransmit a first packet of an internet protocol (IP) multicast to a first set top box device (STB). The method also includes selectively retransmitting the first packet based on a first list that identifies packets to retransmit to the STB and further based on a second list that identifies packets that have been retransmitted to the STB.

Figure 1:
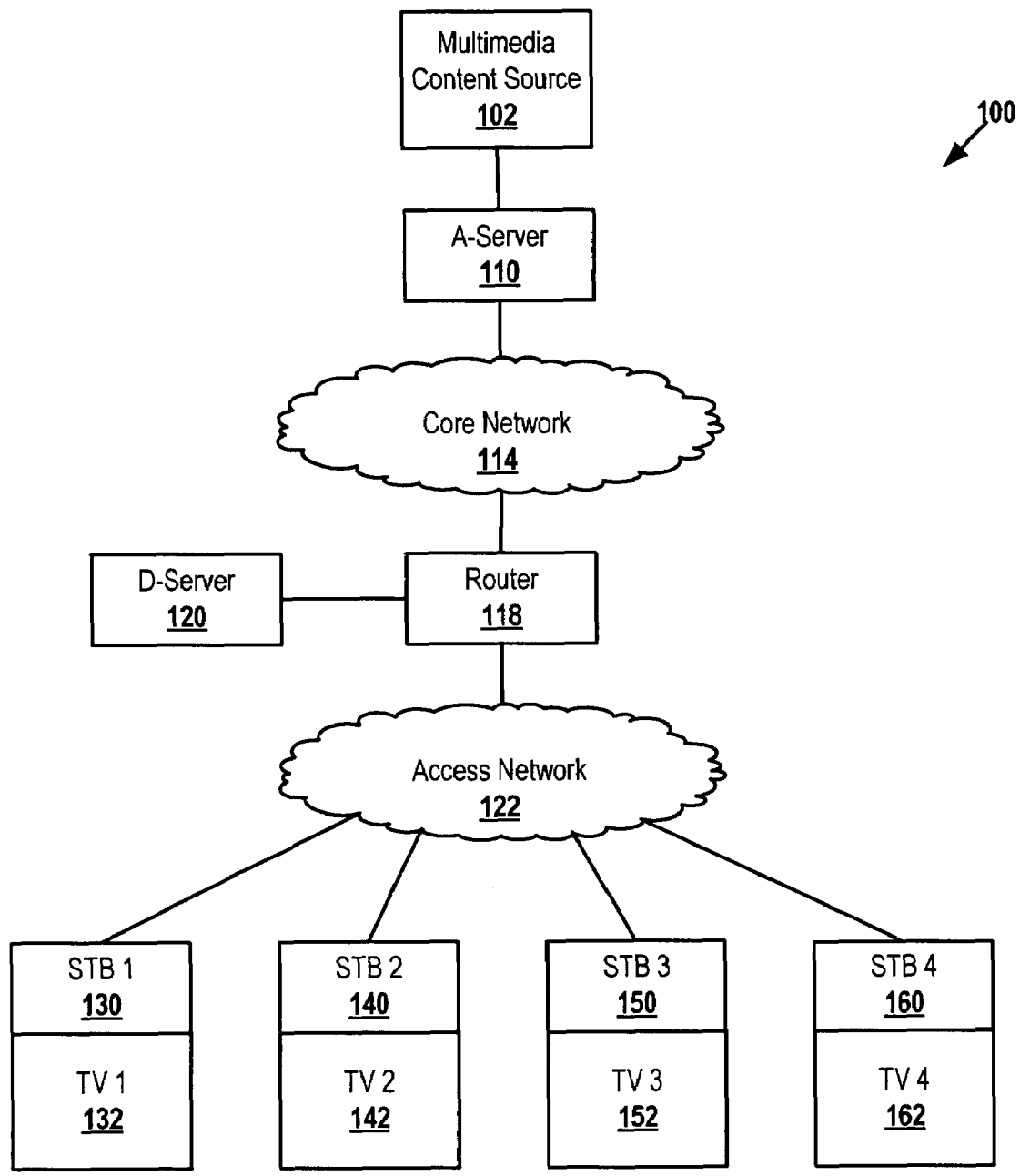
FIG. 1 is a block diagram of a particular embodiment of a system to detect lost video data packets.

Referring to FIG. 1, a particular embodiment of a system to detect lost video data packets is depicted and generally designated 100. The system 100 includes a multimedia content source 102 in communication with a video content acquisition server (A-server) 110. The A-server 110 communicates with a D-server 120 via a core network 114 and a router 118. Further, the D-server 120 communicates with a plurality of set-top boxes via an access network 122. For instance, the access network 122 is in communication with a first set-top box device (STB) 130, a second STB 140, a third STB 150, and a fourth STB 160. Each STB 130, 140, 150, and 160 is coupled to a display device such as a first television 132, a second television 142, a third television 152, and a fourth television 162, respectively.

In a particular embodiment, the multimedia content source 102 can provide multimedia content to the A-server 110 for distribution via the multimedia content distribution network. As illustrative, non-limiting examples, the multimedia content source can include a television content provider, other sources of multimedia content, or any combination thereof.

In a particular embodiment, the A-server 110 may be adapted to encode the multimedia content for transmission to the D-server 120 via the core network 114 and the router 118. In a particular illustrative embodiment, the core network 114 may be a public internet protocol (IP) network, a private IP network, or any combination thereof. The A-server 110 may be adapted to encapsulate the multimedia content into a sequence of IP packets for delivery to the D-server 120. In a particular embodiment, the A-server 110 may be adapted to multicast the multimedia content to multiple D-servers, to one or more of the STBs 130, 140, 150, and 160, to other end-user or network resources (not shown), or any combination thereof, using Real-time Transport Protocol (RTP).

In a particular embodiment, the A-server 110 may be adapted to receive requests to resend packets and to selectively resend the requested packets. In a particular embodiment, the A-server 110 may be adapted to determine if a resent packet has been lost or may still be in transit. The A-server 110 may be adapted to conserve network resources by only resending packets that are determined to be lost.

In a particular embodiment, the D-server 120 may be adapted to receive the multimedia content from the A-server 110 and to store, format, encode, replicate, or otherwise manipulate or prepare the multimedia content for communication to the set-top box devices 130, 140, 150, and 160. In a particular embodiment, the D-server 120 may be adapted to detect when one or more packets of the multimedia content are not received at the D-server 120. In a particular embodiment, each multicast packet may be associated with a multicast packet sequence number. The D-server 120 may be adapted to buffer received packets by sequence number and to transmit a request that identifies missing sequence numbers to the A-server 110.

In a particular embodiment, the D-server 120 may be adapted to send the multimedia content to the set-top box devices 130, 140, 150, and 160 via the router 118 and the access network 120. In a particular embodiment, the access network 120 may be a public IP network, a private IP network, such as an Internet Protocol Television access network, or any combination thereof. In a particular illustrative embodiment, the D-server 120 can be adapted to multicast multimedia content to one or more of the STBs 130, 140, 150, and 160. For example, the D-server 110 may be adapted to transmit multimedia content via IP multicast using RTP. However, in other embodiments the D-server 120 may not be adapted to transmit multimedia content to the STBs 130, 140, 150 and 160 via IP multicast.

In a particular embodiment, the D-server 120 may be adapted to receive requests to resend packets from the STBs 130, 140, 150, and 160 and to selectively resend the requested packets to one or more of the STBs 130, 140, 150, and 160. In a particular embodiment, the D-server 120 may be adapted to determine if a resent packet has been lost or may still be in transit to the requesting STB 130, 140, 150, or 160. The D-server 120 may be adapted to conserve network resources by only resending packets that are determined to be lost.

In a particular embodiment, the set-top box devices 130, 140, 150, and 160 may be adapted to detect when one or more packets of the multimedia content are not received. In an illustrative embodiment, each STB 130, 140, 150, and 160 may be adapted to buffer received packets by packet sequence number and to transmit a request identifying missing packet sequence numbers to the D-server 120.

Although the particular illustrative embodiment of the system 100 of FIG. 1 depicts a single A-server 110, D-server 120, and four STBs 130, 140, 150, and 160, the system 100 can include any number of A-servers 110, D-servers 120, and receiver devices such as STBs 130, 140, 150, and 160. Likewise, the system 100 can include additional servers, switches, routers, and other well-known network elements.

In a particular embodiment, the system 100 may include an Internet Protocol Television (IPTV) system that is adapted to distribute multimedia content from multiple sources. The IPTV system can include a Super Video Head-End Office having multiple A-servers 110 to encode and distribute content from each source. The IPTV system can also include multiple Regional or Video Head-End Offices having multiple D-servers 120 to distribute multimedia content to designated groups of multimedia receivers, such as the representative STBs 130, 140, 150, and 160. In a particular embodiment, the STBs 130, 140, 150, and 160 can include IPTV set-top box devices, video gaming devices or consoles that are adapted to receive IPTV content, personal computers or other computing devices that are adapted to emulate set-top box device functionalities, any other device adapted to receive IPTV content and transmit data to an IPTV system via an access network, or any combination thereof.

Figure 2:
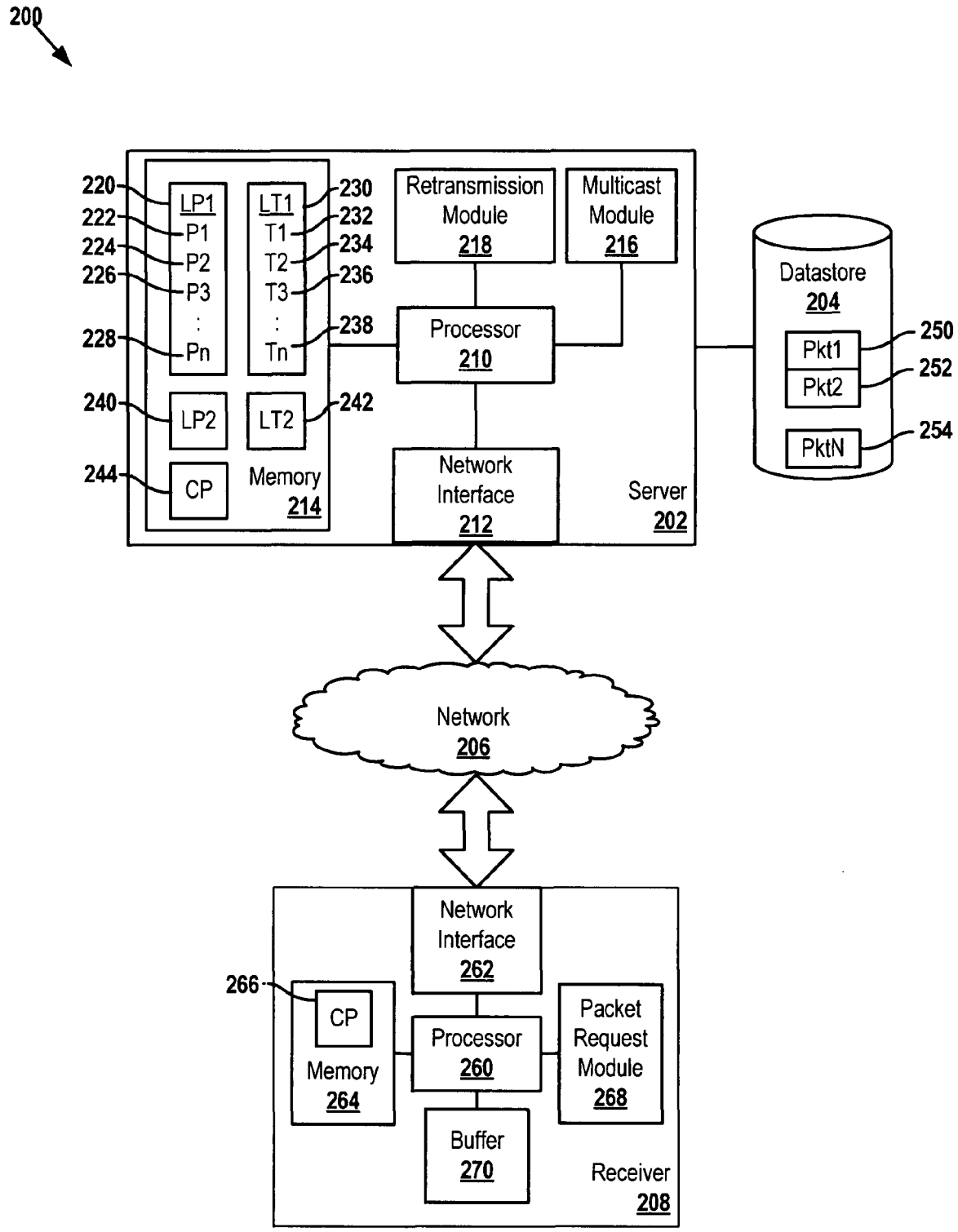
FIG. 2 is a block diagram of a second particular embodiment of a system to detect lost video data packets.

Referring to FIG. 2, a particular illustrative embodiment of a system to detect lost packets is depicted and generally designated 200. The system 200 includes a server 202 coupled to a datastore 204. The server 202 communicates with a receiver 208 via a network 206. In a particular embodiment, the server 202 can be a server of a multimedia content distribution system, such as the A-server 110 or the D-server 120 of FIG. 1.

In a particular embodiment, the receiver 208 may include a processor 260 coupled to a network interface 262, a memory 264, a packet request module 268, and a buffer 270. In a particular embodiment, the memory 264 may include instructions executable by the processor 260, such as one or more computer programs (CP) 266. In a particular embodiment, the receiver 208 may be adapted to receive internet protocol (IP) multicast packets via the network interface 262 and to store the multicast packets at the buffer 270. In a particular embodiment, the receiver 208 may be a network device or end-user device adapted to receive multicast multimedia content, such as the D-server 120 or the STB 130 of FIG. 1.

In a particular embodiment, the packet request module 268 may be executable by the processor 260 to access the buffer 270 and to detect one or more missing packets by examining multicast packet sequence numbers of the received packets. In a particular embodiment, the buffer 270 may include a ring buffer adapted to store received packets in order of sequence number. In a particular embodiment, the packet request module 268 may be executable by the processor 260 to generate and send a message to the server 202 that identifies the sequence numbers of the missing packets. In a particular embodiment, the receiver 208 may be adapted to periodically request missing packets without performing further analysis based on timing or content of prior requests, to reduce costs and conserve processing resources at the receiver 208.

In a particular embodiment, the server 202 includes a processor 210, a network interface 212, a memory 214, a multicast module 216, and a retransmission module 218. In a particular embodiment, the memory 214 can include a first pending list 220 of packets to be retransmitted to the receiver 208 and a first transmitted list 230 of packets that have been retransmitted to the receiver 208. In a particular embodiment, the memory 214 can include one or more second pending lists 240 and second transmitted lists 242 associated with one or more additional receivers (not shown). The memory 214 can also include instructions that are executable by the processor 212, such as one or more computer programs (CP) 244.

In a particular embodiment, the multicast module 216 may be executable by the processor 210 to multicast multimedia content to the network 206 via the network interface 212. The multicast module 216 may be executable by the processor 210 to retrieve multicast packets 250-254 from the datastore 204 and to transmit the multicast packets 250-254 via IP multicast, using Real-time Transport Protocol (RTP), for example. In a particular embodiment, the multicast module 216 may be executable by the processor 210 to associate a multicast packet sequence number to each of the transmitted packets 250-254.

In a particular embodiment, the retransmission module 218 may be executable by the processor 210 to receive requests to resend packets. In a particular embodiment, the retransmission module 218 may be executable by the processor 210 to receive a message from the receiver 208 indicating packets that were not received and to determine a delivery status of the packets. The retransmission module 218 may be executable by the processor 210 to schedule packets for retransmission when the packets have not yet been scheduled. The retransmission module 218 may be executable by the processor 210 to reschedule packets for retransmission when the packets have already been retransmitted but determined to be lost.

In a particular embodiment, the retransmission module 218 may be executable by the processor 210 to maintain the first pending list 220 and the first transmitted list 230 associated with the receiver 208. In a particular embodiment, the first pending list 220 may be maintained as a list of packets 222-228 to be retransmitted to the receiver 208 and ordered by sequence number. In a particular embodiment, the first transmitted list 230 may be maintained as list of packets 232-238 that have been retransmitted to the receiver 208 and ordered by time of retransmittal. In a particular embodiment, the retransmission module 218 may be executable by the processor 210 to schedule packets for retransmission to the receiver 208 by adding the packets' sequence number to the first pending list 220.

In a particular embodiment, the retransmission module 218 may be executable by the processor 210 to retransmit packets to the receiver 208 based on available bandwidth and sequence number. In a particular embodiment, the retransmission module 218 may be executable by the processor 210 to determine a lowest sequence number of the packets 222-228 on the first pending list 220, to retrieve the packet associated with the lowest sequence number from the datastore 204, and to retransmit the packet to the receiver 208. In a particular embodiment, the packet may be retransmitted by sending the packet to the receiver 208 via IP unicast.

In a particular embodiment, the retransmission module 218 may be executable by the processor 210 to remove a packet from the first pending list 220 and to add the packet to the first transmitted list 230 when the packet is retransmitted. In a particular embodiment, a time of retransmission associated with each of the packets 232-238 may be recorded in the first transmitted list 230.

In a particular embodiment, the retransmission module 218 may be executable by the processor 210 to determine a delivery status of the packets 232-238 of the first transmitted list 230 based on the message from the receiver 208. In a particular embodiment, the retransmission module 218 may be executable by the processor 210 to confirm that one or more of the packets 232-238 have been received when the packets are not identified in the message, and to remove the received packets from the first transmitted list 230. In a particular embodiment, any packets 232-238 that were retransmitted before the received packets, but still requested in the message, are considered lost.

In a particular embodiment, the retransmission module 218 may be executable by the processor 210 to determine that none of the packets 232-238 of the first transmitted list 230 have been received when all of the packets 232-238 are identified in the message from the receiver 208. The retransmission module 218 may be executable by the processor 210 to compare an elapsed time since the retransmission of one or more of the packets 232-238 to a threshold. In a particular embodiment, any of the packets 232-238 having an elapsed time exceeding the threshold is considered lost. In a particular embodiment, the threshold is at least partially based on a round trip time between the server 202 and the receiver 208.

In a particular embodiment, the retransmission module 218 may be executable by the processor 210 to remove lost packets from the first transmitted list 230 and to add lost packets to the first pending list 220 for retransmission.

In a particular embodiment, the retransmission module 218 may be executable by the processor 210 to receive and process messages from other receivers (not shown) in a substantially similar manner as the message from the receiver 208. In addition, the retransmission module 218 may be executable by the processor 210 to maintain the one or more second pending lists 240 and the one or more second transmitted lists 242 in a substantially similar manner as the first pending list 220 and the second pending list 230.

Figure 3:
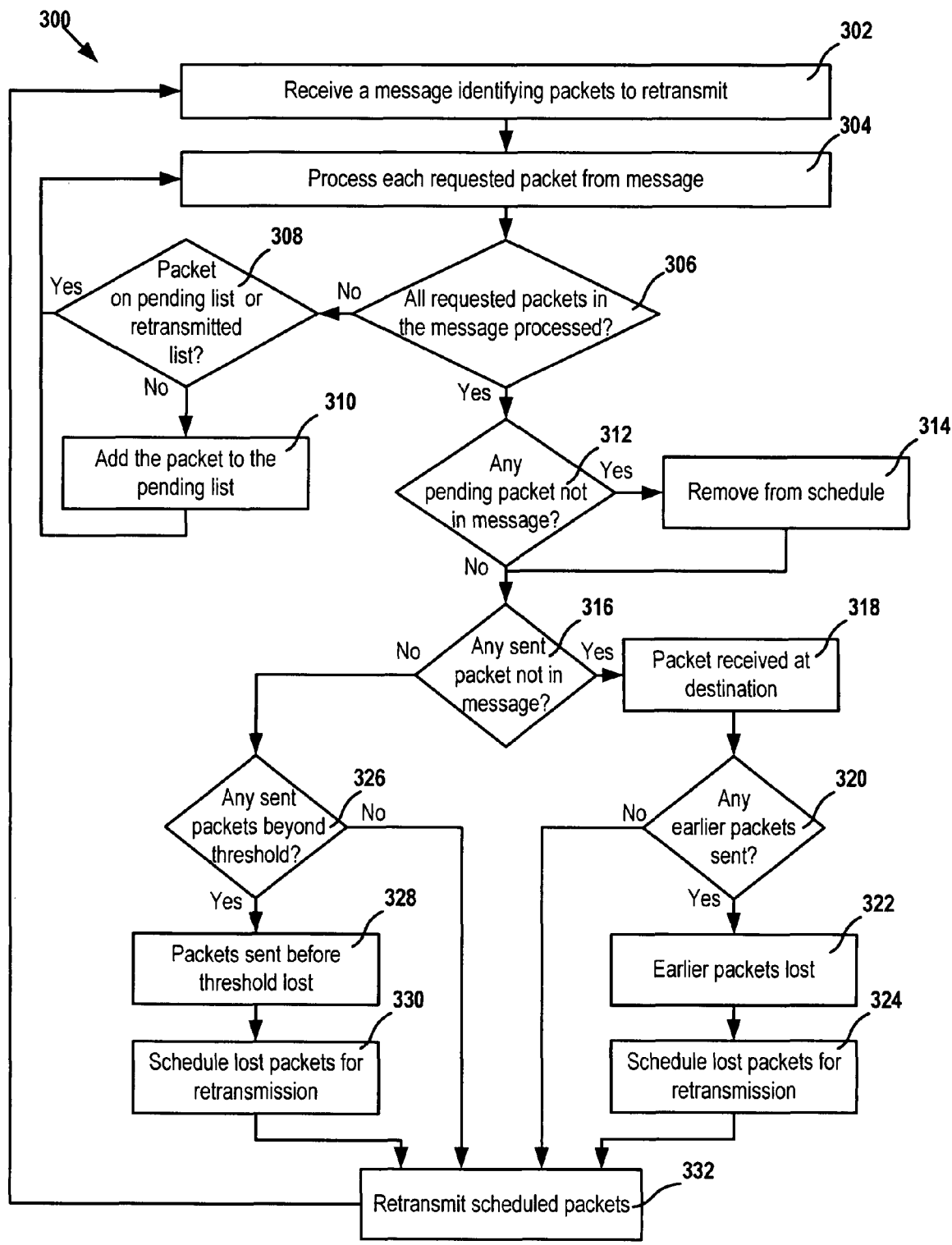
FIG. 3 is a flow chart of a particular embodiment of a method of detecting lost video data packets.

Referring to FIG. 3, a flow chart of a particular illustrative embodiment of a method of detecting lost packets is depicted and generally designated 300. A message that identifies packets to retransmit is received, at 302. In a particular embodiment, the message may be received at a server or multicast source, such as the server 202 of FIG. 2, the A-server 110, or the D-server 120 of FIG. 1.

In particular embodiment, each packet identified by the message may be processed, at 304. At 306, the server determines whether all packets identified in the message have been processed. If the server determines that all packets identified by the message have processed, the method proceeds to 312. Conversely, if the server determines that one or more packets identified by the message have not been processed, the method moves to 308.

At 308, the server determines whether a current packet is on the pending transmission list (pending for retransmission) or on the transmitted list (has already been retransmitted. If server determines that the current packet is pending transmission or has already been transmitted, the method returns to 304, where a next packet from the message may be processed. Conversely, if the server determines that the current packet is neither on the pending transmission list nor on the transmitted list, the method moves to 310. At 310, the packet is added to the pending list for retransmission. The method may return to 304, where a next packet identified by the message may be processed.

In a particular embodiment, a status of each requested packet can be tracked via one or more lists, such as a list of scheduled packets pending retransmission, a list of transmitted packets whose receipt have not yet been verified, other datastructures such as arrays, tables, or databases, or any combination thereof. In a particular embodiment, a status of packets may be identified via one or more flags associated with the packet, associated with a receiver, or any combination thereof, without maintaining separate lists.

Advancing to 312, in a particular embodiment, the server determines whether any packets pending transmission are not identified by the message. If the server determines that all packets pending transmission are identified by the message, the method proceeds to 316. Conversely, if the server determines that any pending packets are not identified by the message, the method moves to 314. At 314, pending packets that are not identified by the message may be removed from the scheduled retransmission. For example, a packet may have been requested by a receiver in a previous message and scheduled for retransmission. While pending retransmission, the original packet may have been received at the receiver, and therefore may not be requested in the later message. As another example, a playback of the multimedia content at the receiver may have occurred or been cancelled, and therefore a previously requested packet may not be indicated by the later message.

Continuing to 316, in a particular embodiment, the server may determine whether any packets that have been sent are not identified by the message. If the server determines that all packets that have been sent are identified by the message, the method proceeds to 326. Conversely, if the server determines that any packet that has been sent is not identified by the message, the method advances to 318. At 318, packets that have been sent and are not identified by the message may be considered received.

Moving to 320, in a particular embodiment, the server determines whether any transmitted packets that have not been received were sent prior to any packets that have been received. If the server determines that all received packets were transmitted prior to all non-received packets, the method advances to 332. Conversely, if the server determines that any transmitted packets that have not been received were sent prior to any received packets, the method moves to 322. At 322, the non-received packets that were sent prior to any received packets may be considered lost. Continuing to 324, lost packets may be scheduled for retransmission.

Moving to 326, in a particular embodiment, the server determines whether an elapsed time since any packet was sent exceeds a threshold. In a particular embodiment, a counter for each transmitted packet may be incremented each time a message is received that identifies the transmitted packet. For example, the counter may be set to zero when a packet is first retransmitted, and may be incremented by an amount representing an elapsed time between messages from the receiver every time the packet is requested in subsequent message from the receiver. In an illustrative embodiment, the threshold may be an approximate round trip delay time between the server and the receiver. If the server determines that no elapsed time since any packet was sent exceeds the threshold, the method advances to 332. Conversely, if the server determines that an elapsed time after sending one or more packets exceeds the threshold, the method advances to 328. At 328, any packets having an elapsed time exceeding the threshold may be considered lost. Continuing to 330, lost packets may be scheduled for retransmission.

Proceeding to 332, in a particular embodiment, scheduled packets pending retransmission may be retransmitted. In a particular embodiment, packets are scheduled for retransmission based on a sequence number of the packet such that a packet having a lowest sequence number of all pending packets is transmitted when bandwidth becomes available. In a particular embodiment, lost packet retransmission bandwidth may be reserved to accommodate a predetermined number of packets sent at regular predetermined intervals. In a particular embodiment, the lost packet retransmission bandwidth may be determined based on network capacity, system traffic, a number of receivers requesting retransmission of lost packets, a total number of lost packets pending retransmission, or any combination thereof.

In a particular embodiment, retransmission of pending packets may continue as a next message is received, at 302, and processed, at 304.

Figure 4:
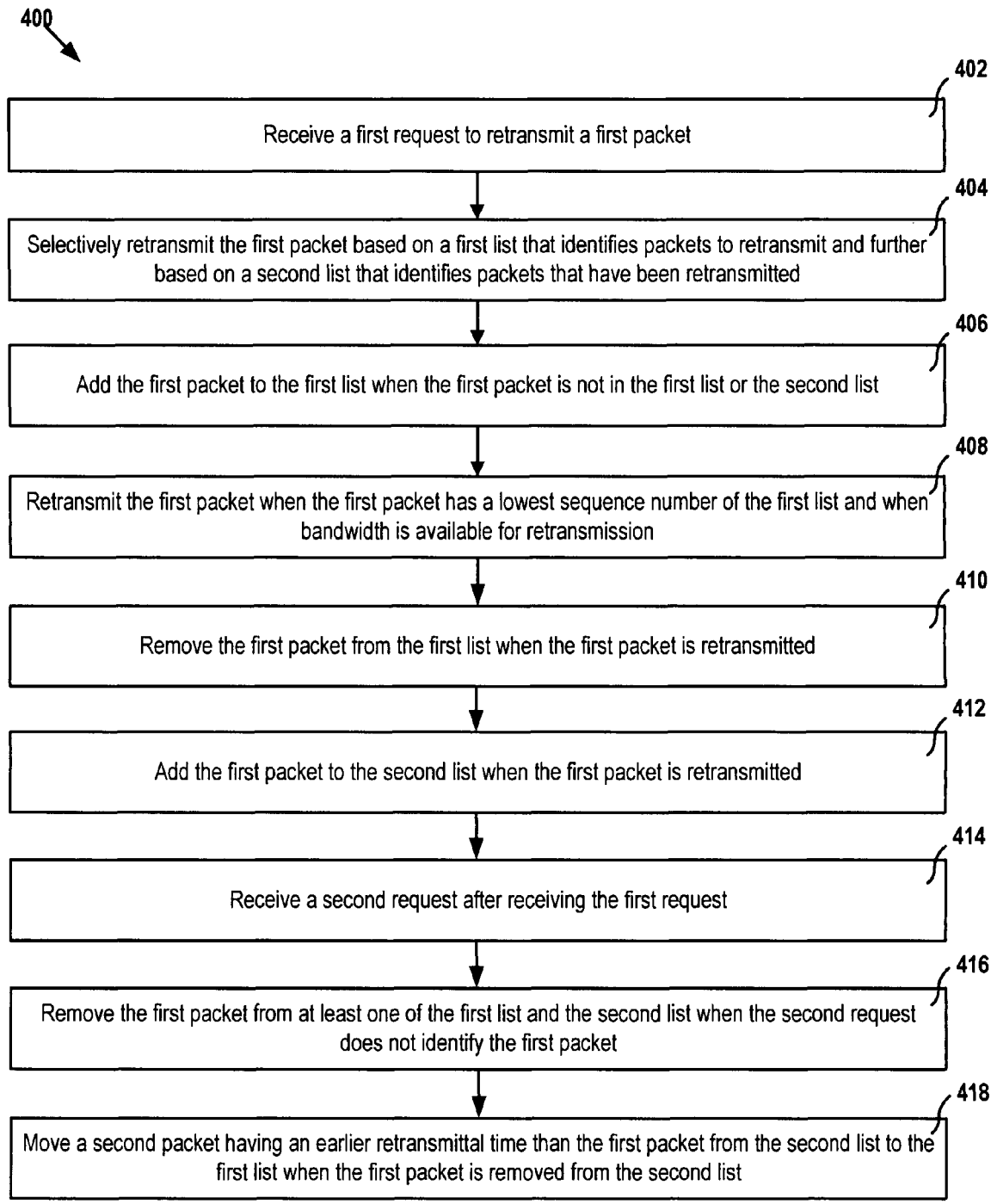
FIG. 4 is a flow chart of a second particular embodiment of a method of detecting lost video data packets.

Referring to FIG. 4, a flow chart of a second particular illustrative embodiment of a method of detecting lost packets is depicted and generally designated 400. At 402, a first request to retransmit a first packet is received. In a particular embodiment, the request may be received at a server of a multimedia content distribution system, such as the A-server 110 or the D-server 120 of FIG. 1.

Advancing to 404, the first packet may be selectively retransmitted based on a first list that identifies packets to retransmit and further based on a second list that identifies packets that have been retransmitted. In an illustrative embodiment, the first list and the second list may identify packets by sequence numbers associated with a prior transmission. For example, the first list may be arranged by sequence number, and the second list may be arranged by order of retransmission.

Continuing to 406, in a particular embodiment, the first packet may be added to the first list when the first packet is not in the first list or the second list. Proceeding to 408, in a particular embodiment, the first packet may be retransmitted when the first packet has a lowest sequence number of the first list and when bandwidth is available for retransmission. Moving to 410, in a particular embodiment, the first packet may be removed from the first list when the first packet is retransmitted. Advancing to 412, the first packet may be added to the second list when the first packet is retransmitted.

In a particular embodiment, the first request may be from a first receiver that is coupled to an internet protocol (IP) access network. Retransmitting the first packet may include sending the first packet to the first receiver via the IP access network. In a particular embodiment, the first packet may be sent to the first receiver via IP unicast.

Continuing to 414, in a particular embodiment, a second request may be received after receiving the first request. Proceeding to 416, the first packet may be removed from at least one of the first list and the second list when the second request does not identify the first packet. Moving to 418, in a particular embodiment, each of the first request and the second request may identify a second packet having an earlier retransmittal time than the first packet, and the second packet can be moved from the second list to the first list when the first packet is removed from the second list.

In conjunction with the disclosed systems and methods, a receiver of a sequence of packet data, such as a set-top box of an Internet Protocol Television (IPTV) system receiving multimedia content via Internet Protocol (IP) multicast, can detect one or more packets missing from the received sequence. The receiver may generate and send a message identifying the missing packets.

The message may be received by a server that is adapted to determine whether requested packets have already been retransmitted, and if so, whether the retransmitted packets are lost or may still be in transit to the receiver. The server may be adapted to retransmit packets multiple times until received or no longer requested by a receiver. The server may be further adapted to determine a round trip delay between the server and the receiver and to not resend packets that may still be on the fly to the receiver. Thus, the server may conserve bandwidth by reducing redundant transmissions and may further enhance quality by enabling multiple retransmissions of a packet as required.

Figure 5:
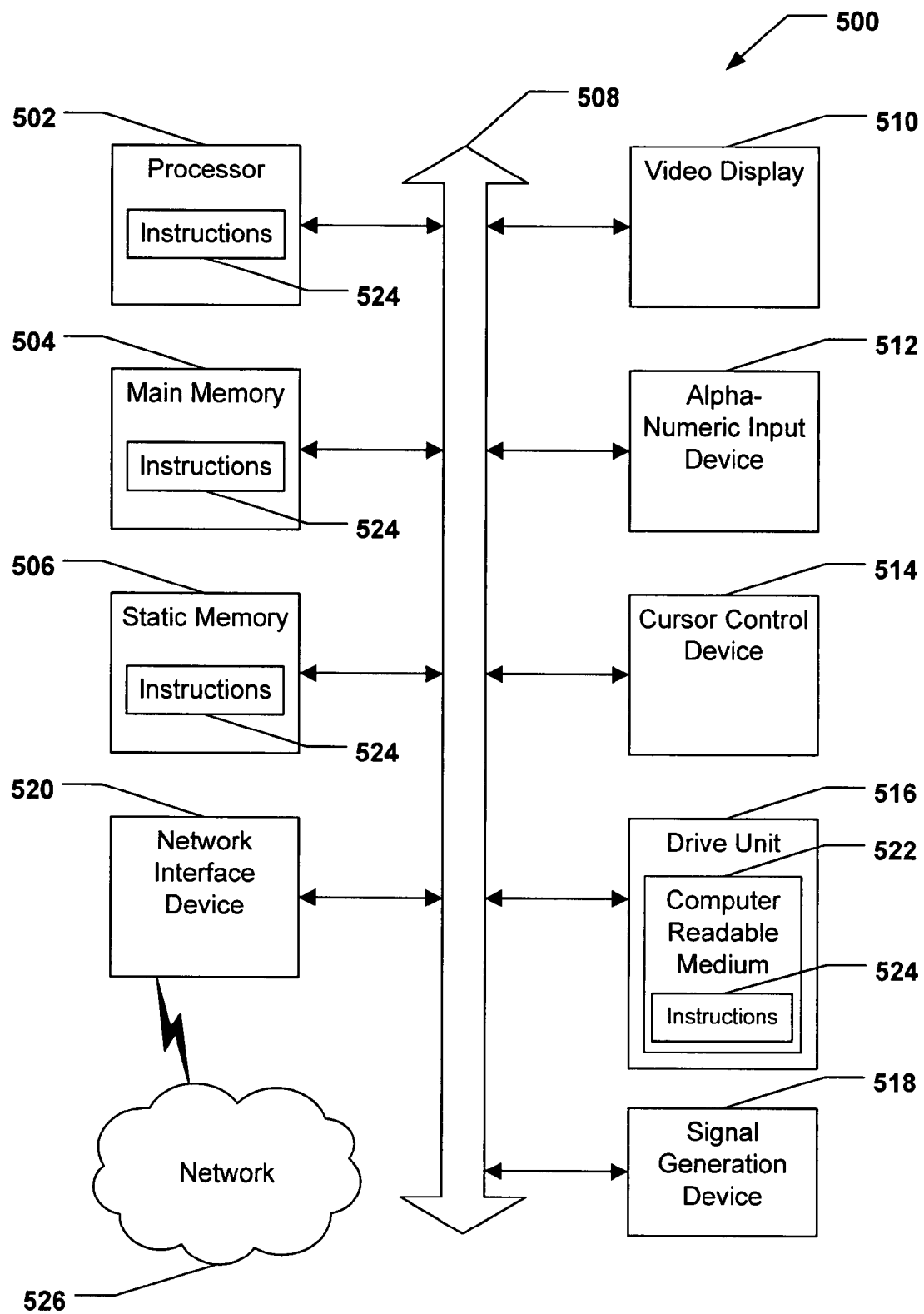
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device, or may be connected, e.g., using a network, to other computer systems or peripheral devices, such as a multimedia content distribution system, an Internet Protocol Television (IPTV) system, a server system, a content source, a multimedia receiver, a set-top box device, a router, switch or other network device, other devices, or any combination thereof. Additionally, in a particular illustrative embodiment, the computing system 500 can communicate with other computing devices via a local area network, a wireless network, or a public network, such as the Internet.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of detecting lost video data packets, the method comprising:
receiving a first request to retransmit a first video data packet;
determining whether the first video data packet is included in one of a first list and a second list, wherein the first list identifies video data packets to retransmit, wherein the second list identifies video data packets that have been retransmitted, and wherein the first list and the second list identify video data packets by sequence numbers associated with a prior transmission;
adding the first video data packet to the first list when the first video data packet is not in one of the first list and the second list;
retransmitting the first video data packet when the first video data packet is in the first list and has a lowest sequence number of the first list and when bandwidth is available for retransmission;
removing the first video data packet from the first list after the first video data packet has been retransmitted;
adding the first video data packet to the second list after the first video data packet has been retransmitted;
receiving a second request after receiving the first request;
determining whether the second request identifies the first video data packet, wherein each of the first request and the second request identifies a second video data packet, the second video data packet having an earlier retransmittal time than the first video data packet;
removing the first video data packet from the second list when the second request does not identify the first video data packet; and
moving the second video data packet from the second list to the first list after the first video data packet is removed from the second list.

2. The method of claim 1, further comprising:
recording in the second list a time of retransmission associated with the first video data packet.

3. The method of claim 1, wherein the first request and the second request are received from a receiver that is coupled to an internet protocol (IP) access network, and wherein retransmitting the first video data packet includes sending the first video data packet to the receiver via the IP access network.

4. The method of claim 3, wherein the first video data packet is sent to the receiver via IP unicast.

5. The method of claim 3, wherein the first list is arranged by sequence number and wherein the second list is arranged by order of retransmission.

6. A system comprising:
an interface to receive data from multiple multimedia receivers via a network; and
a processor and a memory accessible to the processor, wherein the memory includes instructions to cause the processor to execute a method comprising:
receiving a first message indicating that a first packet has not been received at a first multimedia receiver, wherein the first packet is identified relative to a sequence of packets sent via internet protocol (IP) multicast to the first multimedia receiver;
scheduling the first packet to be sent based on the first message and the sequence of packets sent via IP multicast;
sending the first packet to the first multimedia receiver;
recording a time that the first packet is sent to the first multimedia receiver;
maintaining a first list of packets that are scheduled to be sent to the first multimedia receiver based on a delivery status of the packets, wherein the first list is ordered based on the sequence of packets sent via IP multicast; and
maintaining a second list of packets that have been sent to the first multimedia receiver, wherein the second list is ordered based on a time that each packet was sent;
receiving a second message indicating that the first packet has not been received at the first multimedia receiver;
determining a delivery status of the first packet based on the first list and the second list;
rescheduling the first packet to be sent when the delivery status is determined to be lost;
determining whether the packets on the second list that have been sent to the first multimedia receiver are lost or are still in transit to the first multimedia receiver; and
retransmitting the packets on the second list multiple times until received or no longer requested by the first multimedia receiver.

7. The system of claim 6, wherein the method further comprises:
determining that the first packet is lost when the second message does not indicate that a second packet has not been received, wherein the second packet was sent after the first packet; and
resending the first packet.

8. The system of claim 6, wherein the method further comprises:
determining that the first packet is lost when all packets indicated by the first message are indicated by the second message and a threshold amount of time has elapsed after sending the first packet; and
resending the first packet.

9. The system of claim 6, wherein the method further comprises:
maintaining a third list to identify packets that are scheduled to be sent to a second multimedia receiver; and
maintaining a fourth list to identify packets that have been sent to the second multimedia receiver, wherein the third list and the fourth list are independent of the first list and second list.

10. The system of claim 6, wherein the method further comprises:
determining a round trip delay between the system and the first multimedia receiver and delaying retransmission of packets on the second list that are still in transit to the first multimedia receiver based on the round trip delay.

* * * * *